ELECTRONIC KEYER INCLUDING NOISE AND BIAS CONTROL MEANS

Filed March 29, 1963 3 Sheets-Sheet 1

INVENTOR
Robert Hampton Frame

BY Stevens, Davis, Miller & Mosher
ATTORNEYS

July 25, 1967 R. H. FRAME 3,333,108

ELECTRONIC KEYER INCLUDING NOISE AND BIAS CONTROL MEANS

Filed March 29, 1963 3 Sheets-Sheet 2

INVENTOR

Robert Hampton Frame

BY Stevens, Davis, Miller & Mosher

ATTORNEYS

July 25, 1967 R. H. FRAME 3,333,108

ELECTRONIC KEYER INCLUDING NOISE AND BIAS CONTROL MEANS

Filed March 29, 1963 3 Sheets-Sheet 3

INVENTOR

Robert Hamptom Frame

BY Stevens, Davis, Miller & Mosher

ATTORNEYS

United States Patent Office 3,333,108

Patented July 25, 1967

3,333,108

ELECTRONIC KEYER INCLUDING NOISE AND BIAS CONTROL MEANS

Robert H. Frame, Seabrook, Md., assignor to Halliburton Company, a corporation of Delaware Filed Mar. 29, 1963, Ser. No. 269,121
6 Claims. (Cl. 307—88.5)

The present invention relates to a novel and unique electronic apparatus adapted for use in the telegraphy art. More specifically, the present invention relates to a novel electronic apparatus designed, in one use, to enhance and improve the proper functioning of selector magnet units, and, in another use, to enhance and improve transmission of a telegraph coded message.

One of the major difficulties encountered in telegraphy is that generated or received signals can be distorted to such an extent that recovery of the signal becomes virtually impossible. As the receiving end of a telegraph system, the received signal includes much interference and noise, and, consequently, the actual coded message signal may be degraded or distorted to the point that it cannot be recovered by conventional electronic processing. Likewise, in the translation of mechanical motion to corresponding electrical signals such as is currently performed by the transmitter distributor set of a conventional teletypewriter, the generated electrical signals may be so distorted or degraded due to interference or for other reasons that the direct transmission of such signals would lead to ambiguities in the message or loss of parts thereof.

Accordingly, it is the principal object of the present invention to provide in a telegraph system a novel electronic apparatus for processing a generated code signal to be transmitted or a received code signal by utilizing same in an input loop to key a voltage supply in an output loop in a way to reproduce in undistorted and undegraded form the code signal.

The apparatus of the present invention performs the foregoing functions without degrading or distorting the input signal and in fact is able to take an extremely poor input signal, regenerate it, reshape it, remove undesirable characteristics, and provide an output signal that will enable reliable operation of telegraph equipment; at the same time, any undesirable signal characteristics inherent in the output loop are isolated from the input loop.

A further object of the present invention is to provide apparatus of the type described that can be utilized either at the receiving end or transmitting end of a telegraph system or in a repeater station to provide an output that will enable reliable performance of the telegraph equipment.

It is a further object of the present invention to provide apparatus as described which will perform more effectively and efficiently than systems currently in use.

Other and further objects of the invention will become readily apparent from the following detailed description from preferred embodiments of the present invention when taken in conjunction with the appended drawings, in which.

Figure 3:
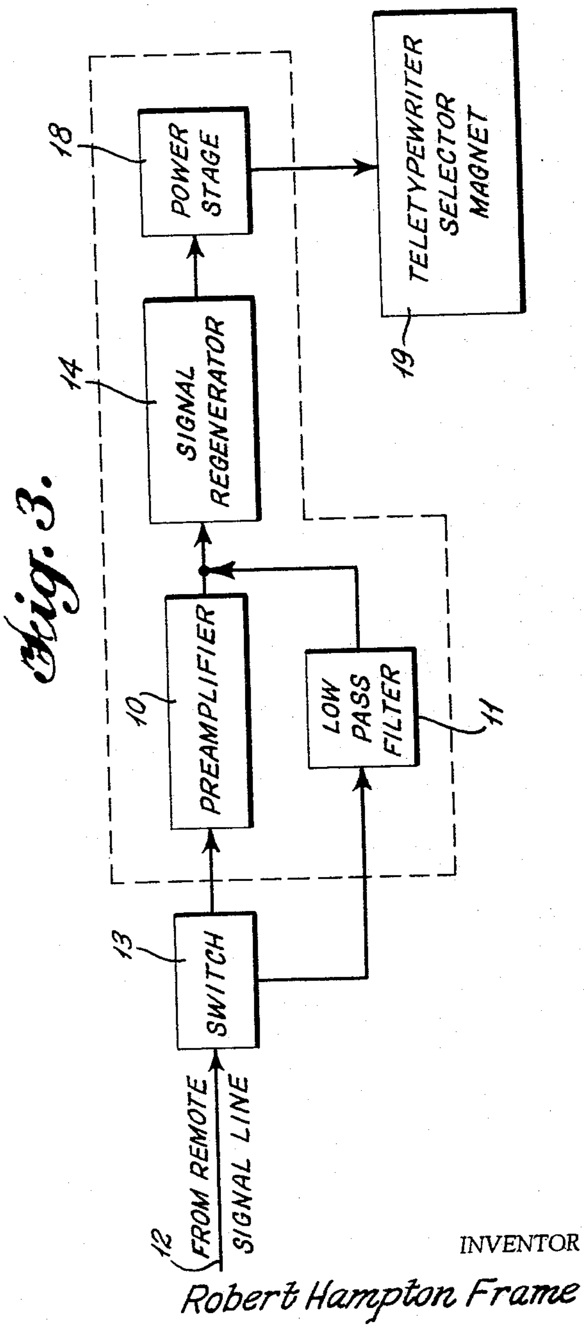
FIGURE 3 is a block diagram illustrating the apparatus of the present invention as employed in the reception of a telegraph message.

Referring now to the drawings in detail, FIGURE 3 shows in block diagram form the apparatus of the present invention as employed in the reception of a telegraph message. As illustrated, a telegraph signal is connected by means of loop 12 to a switch 13 which connects with a preamplifier 10 and low pass filter 11 in parallel. The output from both preamplifier 10 and filter 11 goes to a signal regenerator 14. The output from regenerator 14 goes to a power stage or driver 18 which supplies current to operate the selector magnet of teletypewriter 19.

Figure 4:
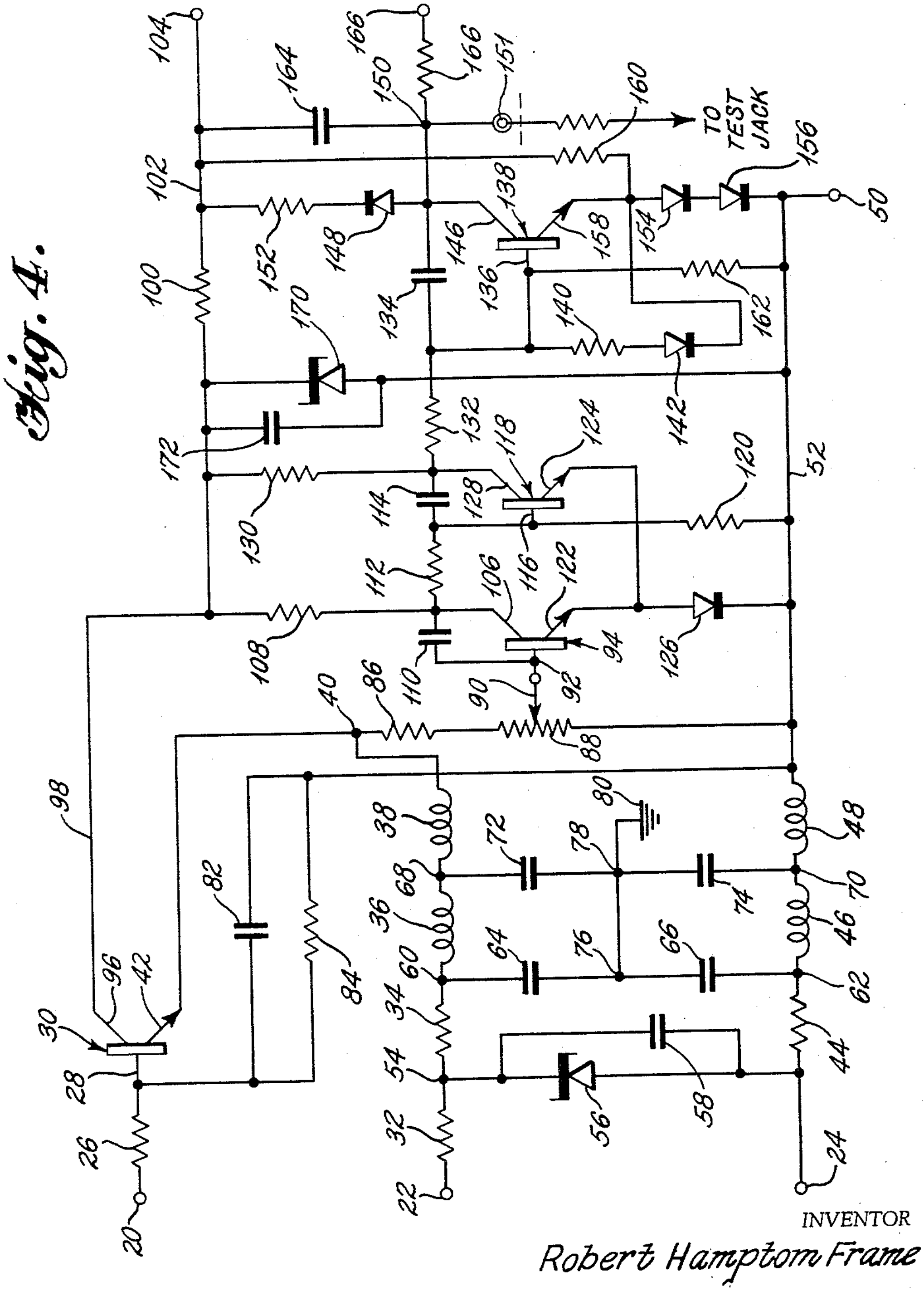
FIGURE 4 is a schematic representation showing in detail the circuits enclosed within the dotted line of FIGURE 3.

The blocks 10, 11, 14 and 18 of FIGURE 3 are shown in detail in FIGURE 4 by means of a schematic diagram. As evident, three input terminals 20, 22 and 24 are provided. Input terminal 20 is connected to one end of resistor 26 the other end of which is connected to the base electrode 28 of transistor 30. Input terminal 22 is connected to resistor 32 which connects with resistor 34, coils 36 and 38, and to junction point 40. The emitter electrode 42 of transistor 30 is also connected to the junction point 40.

Input 24 is connected to resistor 44, coils 46 and 48, and via line 52 to terminal 50 to which the negative side of a 48 volt battery is applied. Connected between junction point 54, between resistors 32 and 34, and input 24, is a Zener diode 56 and a capacitor 58 arranged in parallel. Connected from junction point 60, between resistor 34 and coil 36, to junction point 62, between resistor 44 and coil 46, are a pair of capacitors 64 and 66 arranged in series. Connected between junction point 68, between the coils 36 and 38, and junction 70, between the coils 46 and 48, are a pair of capacitors 72 and 74 arranged in series. Junction 76, between capacitors 64 and 66, is tied to junction 78, between capacitors 72 and 74, and also tied to ground as indicated by reference numeral 80.

The base electrode 28 of transistor 30 is connected to line 52 through capacitor 82 and resistor 84 arranged in parallel. Junction 40 is also connected to line 52 through resistor 86 and potentiometer 88 arranged in series. The arm 90 of potentiometer 88 is connected to base electrode 92 of transistor 94. The collector electrode 96 of transistor 30 is connected by line 98 to resistor 100 which in turn is connected by line 102 to an output terminal 104. The positive side of the 48 volt battery is connected to terminal 104. Collector electrode 106 of transistor 94 is connected to resistor 108 which in turn connects with line 98. The collector electrode 106 also connects with one side of capacitor 110 the other side of which is connected to the base electrode 92 of transistor 94. Collector electrode 106 also connects with one side of resistor 112 the other side of which connects with a capacitor 114 and base electrode 116 of transistor 118. Base electrode 116 is connected through resistor 120 to line 52. The emitter electrode 122 of transistor 94 is tied to emitter electrode 124 of transistor 118 and the two emitter electrodes are connected in common through diode 126 to line 52.

The collector electrode 128 of transistor 118 is connected in common to capacitor 114 and resistors 130 and 132. Resistor 130 is connected to line 98 and resistor 132 is connected in common to capacitor 134 and the base electrode 136 of transistor 138. Resistor 132 also is connected to one side of resistor 140 the other side of which is connected through a diode 142 to junction point 144. The collector electrode 146 of transistor 138 is connected in common to capacitor 134, diode 148 and junction point 150. The diode 148 is connected to line 102 through resistor 152. Junction point 144 is connected through diodes 154 and 156 in series to line 52. Junction point 144 is also connected to emitter electrode 158 of transistor 138 and through resistor 160 to line 102. The base electrode 136 of transistor 138 is tied to line 52 through resistor 162. Junction point 150 is coupled to line 102 through capacitor 164 and to terminal 151 which enables connection of test equipment. Junction point 150 is also connected to terminal 166 through limiting resistor 168. Line 98 is tied to line 52 through Zener diode 170 and capacitor 172 arranged in parallel to provide a constant 20 volt supply to all components to the left as shown in the drawing.

The circuits illustrated in FIGURE 4 comprise essentially a preamplifier provided by transistor 30 connected as an emitter follower across input terminals 20 and 24, a low pass filter comprised of coils 36, 38, 46 and 48 and capacitors 64, 66, 72 and 74 connected across input terminals 22 and 24, a trigger circuit comprised of transistors 94 and 118 and associated components, and a power output stage provided by transistor 138 and its associated components, the output being across terminals 104 and 166.

Potentiometer 88 is employed for the purpose of controlling triggering levels of the transistors 94 and 118 and also enables compensation to be applied for bias distortion of input signals.

The input signals are applied between terminals 20 and 24 or 22 and 24. Signals applied between terminals 20 and 24 are essentially low level or low current signals whereas those applied between terminals 22 and 24 are categorized as high level input signals. As an example, signals applied to terminals 20 and 24 would be of a nominal range of 30 to 40 microamps at potentials of from 4 to 6 volts. Signals applied between terminals 22 and 24 would be about 1 milliampere at 4 to 6 volts. If it is desired to use higher input currents, this can be readily accomplished by adding appropriate shunt resistance across the terminals 22 and 24 and applying the input signals to these terminals.

The circuits illustrated in FIGURE 4 perform the basic function of receiving an input which includes a telegraph code signal which may be badly distorted or degraded and provide at the output terminals 104 and 166 a reformed and regenerated telegraph signal extrapolated from the degraded and distorted input signal applied to it. The ability of the circuits illustrated in FIGURE 4 to achieve this function is due in part to the fact that interference reduction measures are applied to all conceivable interference and noise sources. Thus, any noise produced due to switching action occurring in transistors 94 and 118 is reduced by feedback capacitors 110 and 114 which also function to increase the rise and fall time of the pulses which are derived from this trigger network.

Any noise generated by the power stage is reduced by feedback capacitor 134 and by the series network comprised of resistor 140 and diode 142. Capacitor 134 will also impart considerable shaping to the signal by increasing the rise and fall time of the pulses as well as reducing noise generated in transistor 138. The series circuit of resistor 140 and diode 142, in addition to reducing noise, further provides a "softening" of the turn-on of transistor 138.

The low pass filter network consisting of coils 36, 38, 46 and 48 and capacitors 64, 66, 72 and 74 further functions to suppress noise. Capacitor 82 also functions as a noise suppressor for the emitter follower stage (transistor 30).

The net result of the various means described is to eliminate or greatly attenuate any noise or interference voltages which tend to be developed between the input terminals or between the terminals and ground. Also, a remarkably high degree of attenuation of any noise associated with the signal is obtained.

In the operation of the circuits illustrated in FIGURE 4, for a low level input across terminals 20 and 24, the emitter follower transistor 30 is normally off, transistor 94 of the trigger circuit is off, and transistor 118 of the trigger circuit is on. The power stage transistor 138 is off. For a neutral telegraph signal comprised of positive pulses and no pulses corresponding to marks and spaces, respectively, a positive pulse will turn on the emitter follower and develop an output across resistors 86 and 88. This will in turn bias transistor 94 for conduction and when current starts to flow, a regenerative action will occur due to common diode 126 and coupling resistor 112. Consequently, and extremely rapidly, transistor 118 will turn off and transistor 94 will turn on. All of this action will occur due to the leading edge of a positive pulse when applied to the base electrode 28 of transistor 30. When transistor 118 turns off, the voltage at the collector electrode 128 will rise providing the leading edge of a positive pulse to be applied to the base electrode 136 of power transistor 138. This will turn the power stage on and enable current to flow in the output loop for which the load is the coil of the selector magnet.

When the trailing edge of a positive pulse is applied to emitter follower 30, it is turned off; this turns off transistor 94 and turns on transistor 118. Consequently, power stage 138 is cut off and current to the selector magnet is stopped.

For high level inputs across terminals 22 and 24, the emitter follower 30 is bypassed and the signal is presented to junction point 40 and developed across resistors 86 and 88 following filtering by the low pass filter. Thereafter the processing of the signal is the same.

Figure 1:
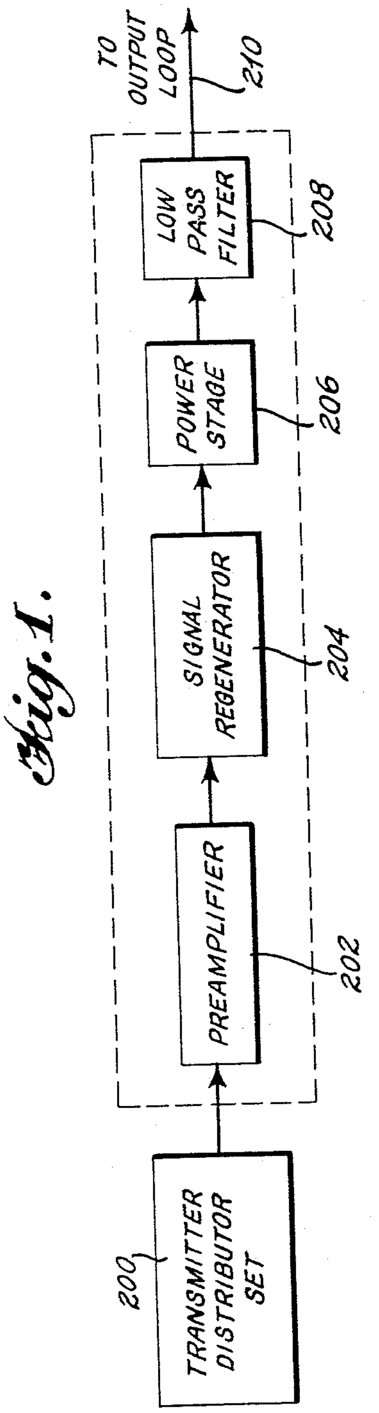
FIGURE 1 is a block diagram illustrating the apparatus of the present invention as employed in the transmission of a telegraph message.

FIGURE 1 illustrates the apparatus of the present invention as applied to the transmission of a telegraph signal. As evident, a conventional transmitter distributor set 200 of a standard teletypewriter feeds its electrical coded signal output to preamplifier 202 the output of which goes to signal regenerator 204 and then to power stage 206 and through low pass filter 208 to output loop 210.

Figure 2:
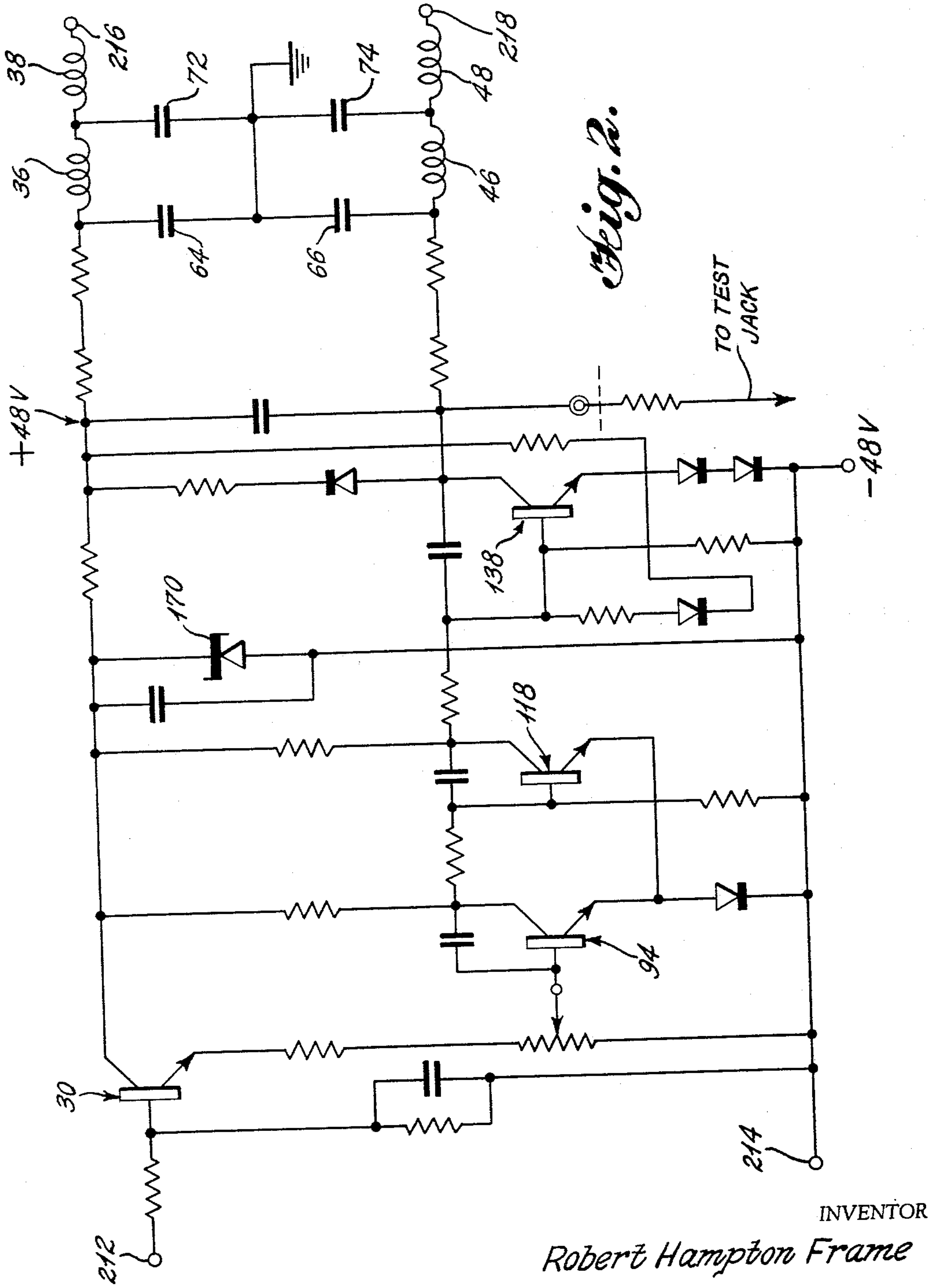
FIGURE 2 is a schematic representation showing in detail the circuits enclosed within the dotted line of FIGURE 1.

The details of the circuits included within the dotted line of FIGURE 1 are shown in detail in FIGURE 2 in schematic form. All parts are the same as discussed with reference to FIGURE 4 except that there is only one set of input terminals 212 and 214 and one set of output terminals 216 and 218. The emitter follower stage includes transistor 30, the signal regenerator stage includes the switching circuit composed of transistors 94 and 118 and associated components, Zener diode 170, the power stage provided by transistor 138 and associated components and the low pass filter comprised of coils 36, 38, 46 and 48 and capacitors 64, 66, 72 and 74. It will be respectfully noted that since the components are the same and are connected in the same relationship for each stage or block, many of the reference numerals have been omitted as redundant. The major distinction between FIGURE 2 and FIGURE 4 is that in place of putting the low pass filter network at the input across its own set of input terminals 22 and 24 as shown in FIGURE 4, the low pass filter is incorporated in the output of the power stage and appears immediately preceding the output terminals 216 and 218.

The operation of the circuits illustrated in FIGURE 2 is the same as the operation of the low level input described in conjunction with FIGURE 4 with the exception that, the output from the power stage is fed through the low pass filter before it is put on the output loop connected to output terminals 216 and 218.

Although the present invention has been shown and described in terms of preferred embodiments, changes and modifications are possible which do not deviate from the concepts taught herein. Such changes and modifications are deemed to come within the purview of the present invention.

What is claimed is:

1. In a telegraph system, a circuit comprising a signal bistable regenerator having two stages and adapted to receive an input bilevel D.C. coded signal, first means connected to the input side of said bistable regenerator for controlling the response level of said bistable regenerator and compensating for bias distortion found in the input signal, said bistable regenerator responding to each level change in the input level, second means for suppressing noise normally produced by said regenerator including capacitors connected between the output and input of each stage of the bistable regenerator, a power transistor, the output of said bistable regenerator connected to said power transistor, and third means connected to said power transistor for reducing noise normally produced by said power transistor and for shaping the output signal produced by said power transistor, whereby the output signal of said power transistor is substantially entirely free of noise.

2. A circuit as set forth in claim 1, wherein said power transsistor has at least a base, emitter and collector electrodes, and said third means includes a capacitor connected between said collector and base electrodes and a resistor and diode connected in series between said base and emitter electrodes.

3. A circuit as set forth in claim 1, further comprising preamplifier means having an input adapted to be connected to the incoming signal and an output connected to said first means, and means connected to said preamplifier means for suppressing a sharp rise and fall time for the output signal of said preamplifier.

4. A circuit as set forth in claim 1, further comprising preamplifier means having an input adapted to be connected to the incoming signal and an output connected to said first means, and means connected to said preamplifier means for suppressing a sharp rise and fall time for the output signal of said preamplifier, said preamplifier means comprising an emitter follower stage and said means for suppressing the sharp rise and fall time of the output signal of said preamplifier comprising capacitor means connected to the input of said emitter follower stage.

5. A circuit as set forth in claim 3, further comprising a low-pass filter circuit, the output of which is connected to said first means, and a switch connected to the inputs of said preamplifier means and said low-pass filter for feeding low magnitude signals to said preamplifier means and high magnitude signals to said low-pass filter means.

6. A circuit as set forth in claim 3, further comprising a low-pass filter circuit having an input connected to the output of said power means and having an output adapted to be connected to an output loop for the telegraph system.

References Cited

UNITED STATES PATENTS

| | | | |
|---|---|---|---|
| 1,599,382 | 9/1926 | Milnor | 178—70 |
| 2,577,444 | 12/1951 | Bliss | 328—164 |
| 2,937,236 | 5/1960 | Kundrotas | 178—70 |
| 2,994,784 | 8/1961 | White et al. | |
| 3,010,094 | 11/1961 | MacArthur | 178—70 |
| 3,069,500 | 12/1962 | King | 178—70 |
| 3,098,939 | 7/1963 | Clapper | 307—88.5 |
| 3,204,188 | 8/1965 | Falk | 307—88.5 |

ARTHUR GAUSS, *Primary Examiner.*

ROBERT H. ROSE, *Examiner.*

A. J. DUNN, R. H. EPSTEIN, *Examiners.*